Feb. 23, 1926.
A. G. D. KREY
1,574,251
ANIMAL POKE
Filed March 6, 1924
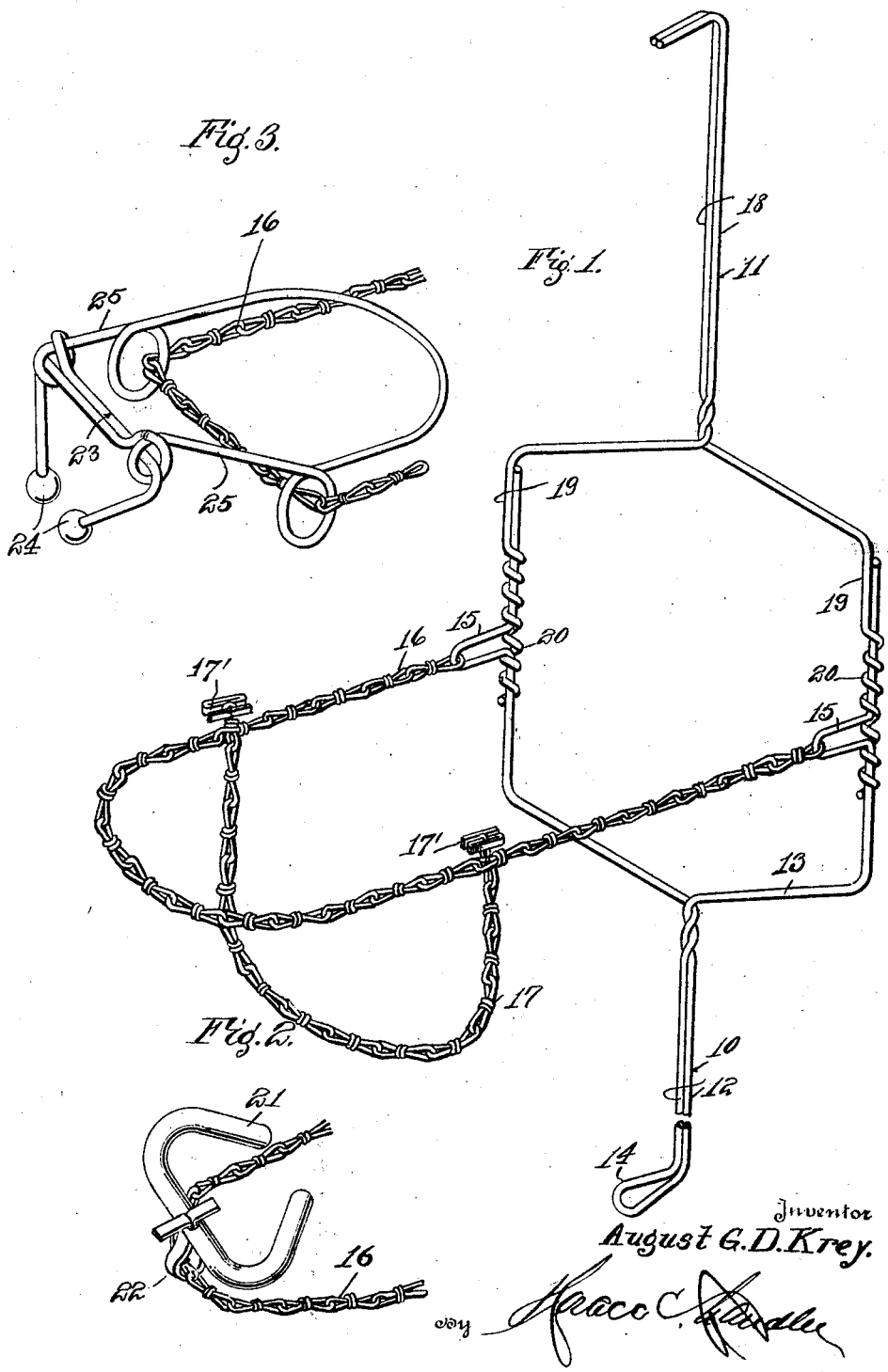

Patented Feb. 23, 1926.

1,574,251

UNITED STATES PATENT OFFICE.

AUGUST G. D. KREY, OF WAGNER, SOUTH DAKOTA.

ANIMAL POKE.

Application filed March 6, 1924. Serial No. 697,284.

*To all whom it may concern:*

Be it known that I, AUGUST G. D. KREY, a Danish subject, residing at Wagner, in the county of Charles Mix, State of South Dakota, have invented certain new and useful Improvements in Animal Pokes; and I do hereby declare the following to be a full, clear, and exact description of the invention, such as will enable others skilled in the art to which it appertains to make and use the same.

This invention relates to new and useful improvements in restraining devices and particularly to animal pokes.

One object of the invention is to provide a poke which may be easily and quickly applied to or removed from the animal, and which is readily adjustable to fit animals of different sizes.

Another object is to provide an animal poke which will remain in proper position on the animal, and which cannot be easily dislodged without pain.

Other objects and advantages will be apparent from the following description when taken in connection with the accompanying drawing.

In the drawing:

Figure 1 is a perspective view of an animal poke, made in accordance with the invention, and showing the parts in the position assumed when adjusted on an animal, and showing the use of a halter.

Figure 2 is a fragmentary view showing the use of a nose engaging means for retaining the poke in position on the animal.

Figure 3 is a fragmentary view showing the use of a modified form of nose engaging means.

Referring particularly to the accompanying drawing, 10 represents the lower portion and 11 the upper portion of the poke. The lower portion is composed of a single length of bar metal, preferably circular in cross section, and bent to form the two strand leg 12 and the outwardly and upwardly extending arms 13 on the upper end thereof. The lower end of the leg is bent to extend outwardly, as shown at 14, while the upper portions of the arms 13 are formed with outwardly extending loops 15. To each of these loops 15 there is connected an end of a chain 16, which is adapted to pass over the head of the animal, while a length of chain 17 is detachably connected at its ends to the intermediate portion of the chain 16, by means of the cotter pins 17', this latter chain being arranged to pass beneath the jaw of the animal.

The upper part of the yoke is formed from two strands of the bar metal, and includes the two strand legs 18, each strand having its lower portion bent to extend downwardly and outwardly, in the manner of the upper portion of the lower member 10. The end portion of each of the arms 19, of the upper member 11, is bent into a spiral form, as shown at 20, to receive the upper end of an arm 13, centrally therein, the loop 15 being engaged between adjacent convolutions of the spiral. The strands of the upper portion 11 are twisted together, at the point of connection with the arms 19, but by reason of the fact that the upper ends of the strands are not connected, said strands are capable of being untwisted, and each spiral portion rotated on an arm 13, so that the spiral portion may be moved lengthwise of the arms 13, thus permitting adjustment of the parts to the neck and shoulders of the animal.

It will, of course, be understood that the frame bounded by the arms 13 and 19, encircle the neck of the animal, and is of such size as to prevent it being slipped over the animal's head. The chain halter serves to maintain the frame against rearward movement to any great extent, but, however, should the animal press the arms or legs 12 and 18 against an object, the pull of the chain on the bone of the animal's nose will produce pain, and act as a deterrent against further action. Thus the device will be effectively maintained in proper position on the head and neck of the animal. The legs 12 and 18 project to sufficient distances above and below the animal's head to effectively prevent the animal pushing its head through a fence, or jumping over a fence, or other barrier.

As another means of holding the device on the head of the animal, and to act as a deterrent against attempts to press the arms 12 and 18 against an object, a nose clamp or ring 21 is pressed onto the animal's nose, and the chain 16 passed through the eye of the cotter pin 22, which is secured in the said ring. This is clearly seen in Figure 2.

In Figure 3 there is shown a modification of the nose engaging means, such modification consisting of a single length of stiff wire bent into U-shaped formation, with the ends of the legs thereof directed inwardly toward each other, and transversely of the yoke, as shown at 23, each of such portions being formed with an eye receiving the other portion, the terminals extending forwardly and provided with knobs 24, for engagement in the nostrils of the animal. The intermediate portion of each of the arms 25, of the yoke, or U-shaped member, is formed with an eye, and passed through these eyes is the intermediate portion of the before mentioned chain 16.

What is claimed is:

1. An animal poke including a neck encircling frame composed of separable sections, each of the sections having a substantially U-shaped portion, one of the sections having separable interlocked parts and the arms of the U-shaped portion provided with spiral coils, the arms of the U-shaped portion of the other section being received in the coiled arms of the first section and having laterally directed loops engaged with the coils whereby the parts of the first section may be independently rotated after being separated to accomplish longitudinal adjustment with relation to the other section, and a head gear carried by said loops.

2. An animal poke including a neck encircling frame composed of separable sections each having a U-shaped portion, the arms of one section being formed with laterally directed loops, the arms of the other section having portions receiving the first arms centrally therein and rotatably and adjustably engaged with said loops, the U-shaped portion of the second section being separable to permit rotation of the arms thereof with relation to the arms of the first section, said second section arms being releasably interlocked.

3. An adjustable frame for an animal poke comprising a pair of substantially U-shaped frame sections, one of the sections including substantially Z-shaped bars, corresponding end portions of said Z-shaped bars being detachably twisted together, the other corresponding end portions of the Z-shaped bars being formed with spiral coils, the arms of the other U-shaped frame section being disposed longitudinally through the coils of the first section, and a lateral projection on each of the arms of the said other U-shaped frame extending laterally through the said coils whereby upon rotation of the Z-shaped bar said bar will move longitudinally of said arm.

4. An extensible frame for an animal poke including a pair of substantially U-shaped frame sections one of which includes separable parts, the arms of the other frame section having lateral projections, the separable parts of the first-named frame section including substantially Z-shaped bars one end portion of each of which is provided with coil turns receiving the corresponding arm of the first section longitudinally therethrough and the lateral projection through the coils thereof, the other end portions of said Z-shaped bars being separably interlocked.

In testimony whereof, I affix my signature.

AUGUST G. D. KREY.